Oct. 19, 1937.   R. L. ATKINSON   2,096,221
SAUSAGE AND ARTIFICIAL CASING THEREFOR
Filed Nov. 8, 1935
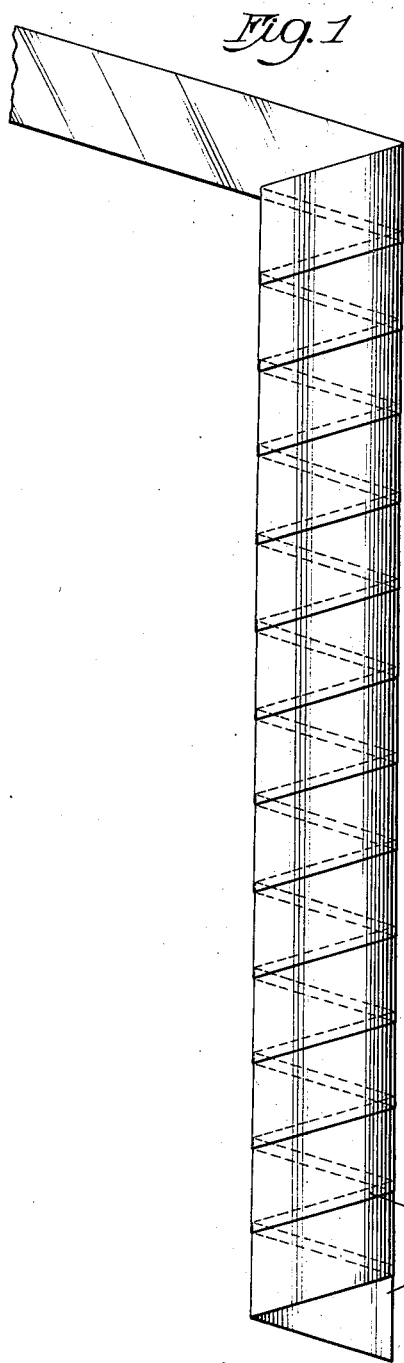
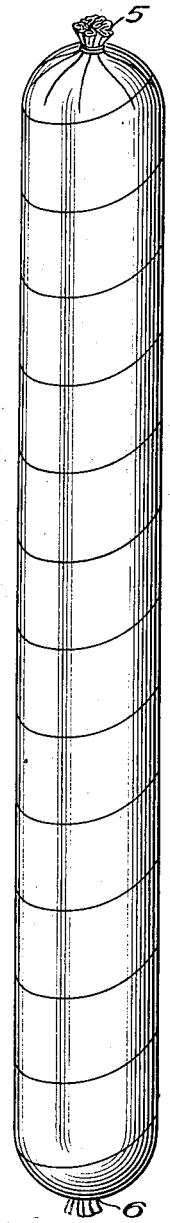
Inventor
Ralph L. Atkinson Patented Oct. 19, 1937

2,096,221

UNITED STATES PATENT OFFICE 2,096,221

SAUSAGE AND ARTIFICIAL CASING THEREFOR

Ralph L. Atkinson, Chicago, Ill., assignor to Transparent Package Company, Chicago, Ill., a corporation of Illinois Application November 8, 1935, Serial No. 48,827

1 Claim. (Cl. 99—176)

My invention relates to an improved artificial casing for sausages and to sausages in which such casings are employed. Previously to my invention natural casings prepared from the entrails of animals have been commonly employed as the containers in which sausage meat is marketed. It has likewise been common to employ fabric casings for the purpose, a tubing of suitable size being formed by sewing together the opposite edges of a strip of cotton or other fabric of suitable width producing a longitudinal seam in the casing. More recently casings have been made from fibrous material treated with cellulosic solution and from cellulosic solutions alone extruded in thin tubular form, the tube being subsequently treated to precipitate, solidify or harden the cellulosic material thereof. These extruded cellulosic tubings have certain advantages over the above mentioned natural and artificial casings, but are expensive and difficult to manufacture, especially where it is desirable that the wall of the casing be very thin as in the small size sausages commonly known as wieners.

The present invention relates to a sausage casing formed of a strip of sheet material helically wound preferably with the edges overlapping and suitably cemented together. In its broader aspect the invention is independent of the particular sheet material used and is applicable to those previously mentioned. The invention is particularly applicable, however, to the formation of sausage casings from cellulosic material in sheet form and will be more specifically described in connection therewith. As compared to casings formed from the other materials mentioned the sausage casings formed from cellulosic material in sheet form are clean, uniform in thickness, may be made of any degree of thinness desired, and transparent or translucent and of any desired coloring. As compared to extruded casings of cellulosic material, the wall thickness thereof is more uniform and may be more readily controlled, particularly where, as in the case of casings for wieners, it is desirable that the casing wall be extremely thin and they are cheaper and easier to manufacture. Stripping of the casing from the enclosed meat is much more readily accomplished in sausages cased according to my invention for the reason that the strip or strips of which the casing is formed readily separate at the helical seams or overlapping edges when an end of the strip or, in the case where a plurality of strips is used, one of them, is grasped and the strip unwound from the sausage. This is true, notwithstanding that the cement or adhesive by which the edges are secured together is of ample strength to withstand the stuffing of the sausage, for the coils of the wound strip readily withstand the pressure of the stuffing operation and indeed the outward pressure of the contents of the casing serves to press the overlapping edges of the strip or strips more firmly together which, of course, would not be the case were the casing formed with a longitudinal seam or seams as has heretofore been proposed.

In the drawing accompanying and forming a part of this specification,

Figure 1 is an elevation of a casing tube of my invention in the process of formation; and Fig. 2 is an elevation of a sausage in which such a casing is employed.

The casing may be formed from a sheet or film of any suitable material, such as fibrous material, parchmentized paper or the like. Preferably a cellulosic material is employed. By known processes of manufacture, the cellulosic material is formed in a sheet or sheets of any desired thickness, the thickness of the sheet being chosen according to the particular form of sausage in which the casings are to be used. Thus for wieners, which are commonly formed in links separated by twisted portions of the casing, a thin material is preferable to facilitate the twisting, while in the case of sausages of larger diameter such, for example, as bologna sausage, which is unlinked, a somewhat thicker sheet material is desirable.

If trade-mark or other printing is desired upon the casing, it is preferable and more convenient and less expensive to print the sheet material before it is cut into strips, the location of the desired markings on the sausage casing being predetermined and the printing correspondingly located on the sheet. Of course, the strips may be printed after they are cut, but this somewhat complicates the printing operation. Either or both sides of the sheet material may be printed, though if it is desired to print the side of the sheet or film which is in contact with the contents of the casing an ink must be chosen which will not deleteriously affect the contents. If desired, the material of the casing may be colored or the surface thereof modified as, for example, with respect to the brilliance or reflecting power thereof and this is preferably done before the sheet is cut into strips.

In the drawing the casing is shown as composed of a single strip, but obviously it may be formed of a plurality of strips without departing from the invention and the adjacent edges may be more or less overlapped. In the particular exemplification shown in the drawing, the single strip 3 of which the casing tube is formed is about 1 inch in width and I have also found a width of 1¼ inches to be satisfactory for sausages of usual sizes. The adjacent edges of the strip may be overlapped to any desired extent and I have illustrated an overlap of something less than ⅛ of an inch as at 4 (Fig. 1). The strip is conveniently wound upon a mandrel to form the tubing.

As heretofore stated, the overlapping edges of the casing are cemented together. This may be accomplished by applying to the edges or one of them before or at the time the strip is wound to form the casing a band of adhesive corresponding in width to the overlap. Any suitable cement or adhesive may be used and the choice of adhesive will depend in part upon the sheet material of which the casing is formed and in part upon the subsequent treatment to which the casing or the sausage formed by stuffing the casing is subjected. Thus, for example, if the casing and sausage are very large or if the pressure to which the casing is subjected in the stuffing operation is relatively great, a stronger adhesive should be used; and if the sausage in which the casing is used is to be subjected to cooking, the adhesive should be substantially waterproof at the temperatures employed. It is necessary that the joint be sufficiently strong to withstand the stuffing operation, but it is preferable that it be not so strong that it will not readily yield when the manufacturer or consumer strips the casing from the sausage. When the casing or the sausage of which it forms an element is not subjected to severe strain or conditions, ordinary pastes such as those made from gum arabic and the like, animal glues, vegetable glues or rubber based cement may be used. For example, a casing intended to be used for uncooked fresh pork sausage, or "chili" will require only an adhesive of ordinary strength and little water resistance. Where the conditions are more severe pyroxylin or other strong cement may be employed. It is desirable that in connection with casings made from cellulosic materials, adhesives of the nature of cellulosic solutions be used and in any event if the casing material is transparent the adhesive to be used should be transparent so that the seam, joint, or overlap may be unobtrusive.

The helically wound tubing is preferably made continuously, by machinery or otherwise, and cut into suitable lengths for casings. The casings, except in the respects previously mentioned are utilized in the preparation of sausages substantially as other casings, as, for example, the extruded casings previously mentioned, are used.

In Fig. 2 of the drawing I have shown a completed sausage, the casing of which is formed from a spirally wound strip of sheet or film material, the ends being closed as usual by gathering the ends of the casing projecting beyond the meat or filling and securing them by tying as at 5, 6 (Fig. 2). After the sausage is otherwise ready for consumption, one of the ends 5, 6 may be cut off or otherwise removed permitting the end of the strip from which the casing is formed to be taken in the fingers and the strip is then readily unwound from the sausage, leaving the meat available for consumption.

Obviously, if the sheet material from which the strips are formed is very thin and a stronger casing is desired, two or more plies may be used wrapped in the same or in reversed spirals or helices. By suitably printing the sheet material, trade marks or other indicia or advertising matter may be made to appear wherever desired upon the casings.

For shipping to customers, casings are ordinarily packed in flattened condition to save space. This is true also of my improved casing and preferably the printing, trade mark or descriptive matter, is so located on the strip or sheet from which the casing is formed that the printing will appear entirely on one or the other of the sides of the flattened casing, or on both, but will not be intersected by the fold or flattened edge of the casing.

As heretofore stated if the adhesive is not too strong, in preparing the sausage for consumption, the casing may be stripped by unwinding the strip of material from which it is formed, the edges of the strip parting at the joint. But if the adhesive used is too strong to permit this, nevertheless the spirally formed casing may be readily stripped as the edge of the spiral seam or overlap forms a natural guide along which the strip tears as it is unwound.

Though I have described the casing of my invention in connection with the manufacture of sausages, it is obvious that it may be employed for a variety of other uses as for wrapping or enclosing cigars, candy, or the like.

I claim:

A sausage comprising a meat filling and a casing formed of a spirally wound strip of cellulosic sheet material and having overlapping seams cementitiously adhered together by a material capable of resisting the stuffing pressure but adapted to have its bond readily broken by a peeling of the strip to expose the filling, the ends of the casing being gathered to close the same and providing tab-like portions for facilitating said peeling.

RALPH L. ATKINSON.